US008845481B2

(12) United States Patent
Whitney et al.

(10) Patent No.: US 8,845,481 B2
(45) Date of Patent: Sep. 30, 2014

(54) METHOD AND APPARATUS FOR EXECUTING A TRANSMISSION SHIFT IN A POWERTRAIN SYSTEM INCLUDING A TORQUE MACHINE AND AN ENGINE

(75) Inventors: Christopher E. Whitney, Commerce, MI (US); Adam J. Heisel, Garden City, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 551 days.

(21) Appl. No.: 13/152,328

(22) Filed: Jun. 3, 2011

(65) Prior Publication Data

US 2012/0309585 A1 Dec. 6, 2012

(51) Int. Cl.
*B60W 10/02* (2006.01)
*B60W 10/06* (2006.01)
*B60W 10/08* (2006.01)

(52) U.S. Cl.
USPC .................................. 477/5; 477/83; 477/90

(58) Field of Classification Search
USPC .............................................. 477/3, 5, 83, 90
See application file for complete search history.

(56) References Cited

U.S. PATENT DOCUMENTS

| | | | | |
|---|---|---|---|---|
| 5,833,570 A * | 11/1998 | Tabata et al. | ....................... | 477/3 |
| 6,602,164 B2 * | 8/2003 | Yoshiaki et al. | .............. | 477/107 |
| 7,377,877 B2 * | 5/2008 | Ogata | ................................ | 477/3 |
| 7,434,641 B2 | 10/2008 | Takami et al. | | |
| 8,195,370 B2 * | 6/2012 | Simon et al. | ..................... | 701/54 |
| 8,512,200 B2 * | 8/2013 | Falkenstein et al. | .............. | 477/3 |
| 2005/0143217 A1 * | 6/2005 | Suzuki et al. | ...................... | 477/5 |
| 2010/0273604 A1 * | 10/2010 | Imaseki | ............................ | 477/5 |

OTHER PUBLICATIONS

U.S. Appl. No. 13/029,381, Michael Arnett.
U.S. Appl. No. 13/151,327, Ganley.
U.S. Appl. No. 13/152,380, Arnett.
U.S. Appl. No. 13/151,373, Haggerty.
U.S. Appl. No. 13/152,328, Whitney.
U.S. Appl. No. 13/170,428, Wang.

* cited by examiner

*Primary Examiner* — Jacob S Scott

(57) ABSTRACT

A method for operating a powertrain system including a torque machine coupled to an internal combustion engine that is coupled to a transmission includes, upon commanding a shift in a transmission operating range, activating an immediate response mode to effect the shift. Activating the immediate response mode includes controlling the engine to achieve a predicted engine torque command, and controlling motor torque of the torque machine in response to a difference between an actual engine torque and an immediate crankshaft torque for shift command. An arbitrated predicted motor torque is determined. A possible crankshaft torque is determined in response to the arbitrated predicted motor torque and the predicted engine torque command. Operation of the transmission at the end of the shift event is commanded in response to the possible crankshaft torque. A predicted response mode is activated to complete the shift in the transmission operating range.

17 Claims, 4 Drawing Sheets

METHOD AND APPARATUS FOR EXECUTING A TRANSMISSION SHIFT IN A POWERTRAIN SYSTEM INCLUDING A TORQUE MACHINE AND AN ENGINE

TECHNICAL FIELD

This disclosure is related to powertrain systems employing torque machines, internal combustion engines and automatic transmissions.

BACKGROUND

The statements in this section merely provide background information related to the present disclosure. Accordingly, such statements are not intended to constitute an admission of prior art.

Known vehicle powertrain system systems include one or more torque actuators coupled to transmissions that transfer torque to a driveline for tractive effort. Known torque actuators include internal combustion engines and electric motor/generators. An electric motor/generator may be used in a belt-alternator-starter (BAS) system as a torque actuator in place of an alternator. Known BAS systems include a serpentine belt to transfer torque between the engine and the electric motor/generator. Known BAS systems use a high-voltage energy storage system supplying high-voltage electrical power through a voltage inverter to the motor/generator unit.

Known transmissions include automatic transmissions which effect shifts in gear ratios to achieve a preferred match between an operator torque request, an engine operating point and a transmission gear ratio.

Known automatic transmissions execute upshifts to shift to a higher gear having a lower numerical multiplication ratio (gear ratio) and execute downshifts to shift to a lower gear having a higher numerical multiplication ratio. A transmission upshift requires a reduction in engine speed so the engine speed matches transmission output speed multiplied by the gear ratio at the target gear ratio. Known control systems reduce engine speed when executing an upshift event by reducing engine torque to minimize wear of transmission clutches. Known control systems act to increase engine torque at completion of an upshift event to provide greater engine torque to achieve constant axle torque at the lower gear ratio associated with the target gear ratio.

Known driver interpretation systems convert an operator torque request, e.g., an accelerator pedal position, into a desired amount of axle torque, engine power or engine torque. This operator torque request is translated into a crankshaft torque request to increase engine torque at completion of an upshift event, which provides an increase in engine torque to achieve a constant axle torque at the lower gear ratio associated with the target gear ratio. This crankshaft torque request may be in the form of a predicted and an immediate crankshaft torque request. A predicted crankshaft torque request is used to control actuators that respond with a slow, filtered response and preferably is an unfiltered indication of driver intent. On both compression-ignition engines and spark-ignition engines, the predicted torque request is used to control airflow actuators including turbochargers, throttles, cam phasers and EGR valves. An immediate crankshaft torque request is used to control actuators configured with fast accurate control. On a spark-ignition engine, fast actuators include spark ignition timing and fuel cutoff. Spark retard removes energy from combustion by producing heat instead of torque. Fuel cutoff may affect exhaust gas feedstream composition and emissions. Spark retard may affect fuel consumption. Thus, the immediate crankshaft torque request is preferably disabled under most driving situations. On a compression-ignition engine, the immediate torque request is controlled using fuel mass and injection timing. There is minimal penalty in emissions or fuel economy in using controlled fuel mass and injection timing to control to an immediate torque request. Thus, the immediate crankshaft torque request is preferably constantly enabled on a compression-ignition engine.

Known BAS systems arbitrate predicted and immediate crankshaft torque requests with predicted and immediate torque requests from other functions including requests associated with transmission shift torque management. Final arbitrated predicted and immediate torque requests are sent to an optimization system, which determines how to achieve the predicted and immediate crankshaft torque requests with available actuators in a fuel-efficient manner. The predicted crankshaft torque request is used to control engine airflow in conjunction with electric current flow to an electric torque machine to achieve the predicted crankshaft torque request. On a spark-ignition engine, an immediate crankshaft torque request that includes a reduction in torque is used to control spark timing and control electric regeneration using the electric torque machine, with priority given to using the electric torque machine at its maximum torque capacity for electric regeneration before using spark retard to absorb torque.

Known transmission shift control schemes generate an immediate crankshaft torque request at the beginning of the shift event that is used to reduce engine torque. The torque reduction during the shift event assists the transmission clutches in reducing engine speed. As engine speed is reduced, the crankshaft torque request increases to achieve a constant crankshaft power delivery at the end of the shift. A transmission shift control scheme uses the operator torque request during execution of a shift event to schedule clutch pressures to achieve the preferred magnitude of torque at the end of the shift. Toward the end of the shift event, the immediate crankshaft torque request ramps toward a possible crankshaft torque. The possible crankshaft torque is the torque that would have been achieved if the immediate crankshaft torque request were not commanded.

Known control systems generate a magnitude of possible crankshaft torque to indicate a magnitude of unmanaged crankshaft torque capacity at a present engine operating point when operating without constraints, i.e., without an immediate crankshaft torque request. This is known as air torque. The air torque is the magnitude of torque that an engine produces at a present measured/estimated air per cylinder, with optimum spark advance (or fuel injection timing) and with all cylinders being fueled. For a constant throttle position, the air per cylinder increases as the engine speed decreases to deliver a constant power under most operating positions.

A possible crankshaft torque during a shift event that is too high may cause a transmission controller to schedule too much clutch pressure and create a rough shift as the gears grab too quickly. A possible crankshaft torque during a shift event that is too low may cause a transmission controller to schedule too little clutch pressure and create clutch slipping because the clutches are unable to completely engage the spinning shaft at the end of a shift. Known control systems account for generator/alternator load as an accessory load that is subtracted from the possible crankshaft torque.

SUMMARY

A powertrain system includes a torque machine coupled to an internal combustion engine coupled to the transmission to transfer torque to a driveline. A method for operating the powertrain system includes, upon commanding a shift in a transmission operating range, activating an immediate response mode to effect the shift. Activating the immediate response mode includes controlling the engine to achieve a predicted engine torque command, and controlling motor torque of the torque machine in response to a difference between an actual engine torque and an immediate crankshaft torque for shift command. An arbitrated predicted motor torque is determined. A possible crankshaft torque is determined in response to the arbitrated predicted motor torque and the predicted engine torque command. Operation of the transmission at the end of the shift event is commanded in response to the possible crankshaft torque. A predicted response mode is activated to complete the shift in the transmission operating range.

BRIEF DESCRIPTION OF THE DRAWINGS

One or more embodiments will now be described, by way of example, with reference to the accompanying drawings, in which.

DETAILED DESCRIPTION

Figure 1:
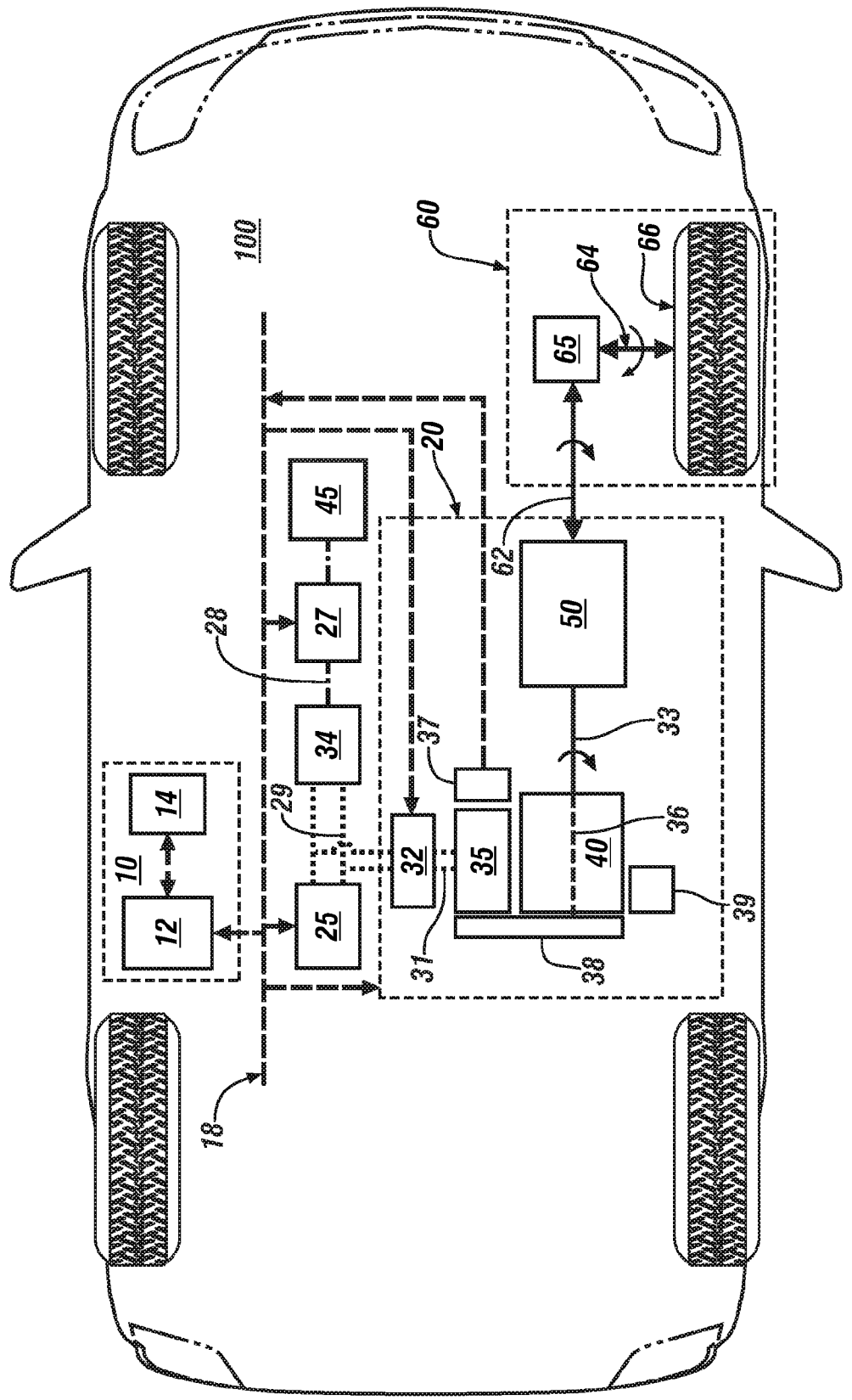
FIG. 1 illustrates a vehicle including a powertrain system including an electrically-powered torque machine mechanically coupled to an internal combustion engine that mechanically couples to a transmission and is controlled by a control system in accordance with the disclosure.

Referring now to the drawings, wherein the showings are for the purpose of illustrating certain exemplary embodiments only and not for the purpose of limiting the same, FIG. 1 schematically shows a vehicle 100 including a powertrain system 20 coupled to a driveline 60 and controlled by a control system 10. Like numerals refer to like elements throughout the description.

The powertrain system 20 includes an electrically-powered torque machine 35 mechanically coupled to an internal combustion engine 40 that mechanically couples to a transmission 50. The electrically-powered torque machine 35 and the internal combustion engine 40 are torque actuators. The electrically-powered torque machine 35 mechanically couples to the engine 40 via a belt-alternator-starter mechanism 38 that mechanically couples to a crankshaft 36 of the internal combustion engine 40 and provides a mechanical power path therebetween. The crankshaft 36 of the internal combustion engine 40 mechanically couples to an output member 33 that mechanically couples to the transmission 50. The transmission 50 includes an output member 62 that couples to the driveline 60. In one embodiment, the belt-alternator-starter mechanism 38 includes a serpentine belt routed between a pulley attached to the crankshaft 36 of the engine 40 and another pulley attached to a rotating shaft coupled to a rotor of the torque machine 35. The aforementioned elements form a belt-alternator-starter (BAS) system.

The engine 40 is preferably a multi-cylinder internal combustion engine that converts fuel to mechanical power through a combustion process. The engine 40 is equipped with a plurality of actuators and sensing devices for monitoring operation and delivering fuel to form a combustion charge to produce torque that is responsive to an operator torque request. The engine 40 preferably includes a low-voltage solenoid-actuated electrical starter 39 for starting in response to a key-crank event.

The torque machine 35 is preferably a multi-phase electric motor/generator configured to convert stored electric energy to mechanical power and convert mechanical power to electric energy that may be stored in a high-voltage battery 25. The torque machine 35 includes a rotor and a stator and an accompanying resolver 37. The resolver 37 is a variable reluctance device including a resolver stator and a resolver rotor that are assembled onto the rotor and stator, respectively, of the torque machine 35.

A high-voltage battery 25 electrically connects to an inverter module 32 via a high-voltage DC bus 29 to provide high-voltage DC electric power in response to control signals originating in the control module 10. The inverter 32 electrically connects to the torque machine 35 via a multi-phase power bus 31. The inverter 32 is configured with suitable control circuits including power transistors for transforming high-voltage DC electric power to high-voltage AC electric power and transforming high-voltage AC electric power to high-voltage DC electric power. The inverter 32 preferably employs pulsewidth-modulating control to convert stored DC electric power originating in the high-voltage battery 25 to AC electric power to drive the torque machine 35 to generate torque. Similarly, the inverter 32 converts mechanical power transferred to the torque machine 35 to DC electric power to generate electric energy that is storable in the high-voltage battery 25 as part of a regenerative control strategy. It is appreciated that the inverter 32 is configured to receive motor control commands and control inverter states to provide the motor drive and regeneration functionality.

In one embodiment, a DC/DC electric power converter 34 electrically connects to a low-voltage bus 28 and a low-voltage battery 27, and electrically connects to the high-voltage bus 29. Such electric power connections are known and not described in detail. The low-voltage battery 27 electrically connects to an auxiliary power system 45 to provide low-voltage electric power to low-voltage systems on the vehicle, including, e.g., electric windows, HVAC fans, seats, and the low-voltage solenoid-actuated electrical starter 39.

The transmission 50 preferably includes one or more differential gear sets and activatable clutches configured to effect torque transfer in one of a plurality of fixed-gear operating modes over a range of speed ratios between the engine 40 and the output member 62. The transmission 50 includes any suitable configuration, and is preferably configured as an automatic transmission to automatically shift between the fixed-gear operating modes to operate at a gear ratio that achieves a preferred match between an operator torque request and an engine operating point. The transmission 50 automatically executes upshifts to shift to an operating mode having a lower numerical multiplication ratio (gear ratio) and executes downshifts to shift to an operating mode having a higher numerical multiplication ratio. A transmission upshift requires a reduction in engine speed so the engine speed matches transmission output speed multiplied by the gear ratio at a gear ratio associated with the target operating mode. A transmission downshift requires an increase in engine speed so the engine speed matches transmission output speed multiplied by the gear ratio at a gear ratio associated with the target operating mode. An inaccurate matching of engine speed and torque with transmission speed and torque may result in a sag in vehicle speed or torque output or clutch slippage upon execution of a transmission shift event.

The driveline 60 may include a differential gear device 65 that mechanically couples to an axle 64 or half-shaft that mechanically couples to a wheel 66 in one embodiment. The driveline 60 transfers tractive power between the transmission 50 and a road surface. It is appreciated that the powertrain system 20 is illustrative.

The control system 10 includes a control module 12 that is signally connected to an operator interface 14. The control module 12 preferably signally and operatively connects to individual elements of the powertrain system 20 either directly or via a communications bus 18. The control module 12 signally connects to the sensing devices of each of the high-voltage battery 25, the inverter module 32, the torque machine 35, the engine 40, and the transmission 50 to monitor operation and determine parametric states thereof. The operator interface 14 of the vehicle 100 includes a plurality of human/machine interface devices through which the vehicle operator commands operation of the vehicle 100, including, e.g., an ignition switch to enable an operator to crank and start the engine 40, an accelerator pedal, a brake pedal, a transmission range selector (PRNDL), a steering wheel, and a headlamp switch. One vehicle operator command of interest is the operator torque request, which may be determined via operator inputs to the accelerator pedal and the brake pedal.

The powertrain system 20 includes a communications scheme including the communications bus 18 to effect communications in the form of sensor signals and actuator command signals between the control system 10 and elements of the powertrain system 20. It is appreciated that the communications scheme effects information transfer to and from the control system 10 using one or more communications systems and devices, including, e.g., the communications bus 18, a direct connection, a local area network bus, a serial peripheral interface bus, and wireless communications.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other suitable components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
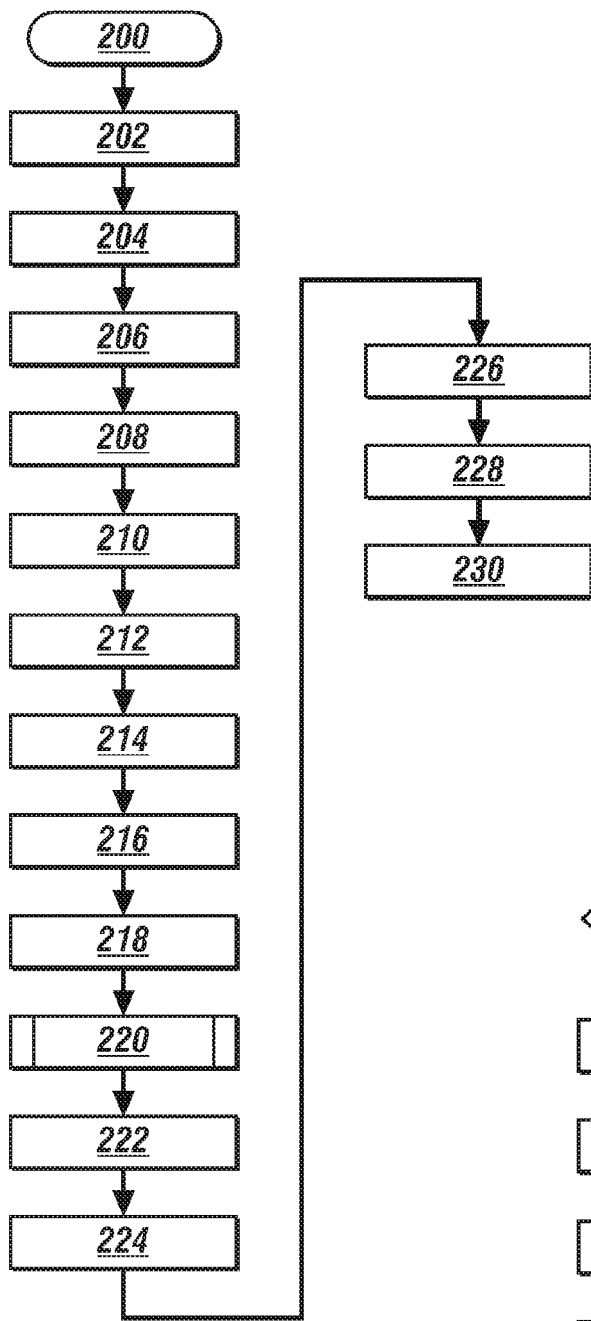
FIGS. 2 and 3 illustrate a control scheme in the form of a flowchart that describes executing a transmission upshift in a powertrain system including an electrically-powered torque machine mechanically coupled to an internal combustion engine that mechanically couples to a transmission in accordance with the disclosure.

FIG. 2 is a control scheme 200 in the form of a flowchart for executing a transmission shift in a powertrain system including an electrically-powered torque machine mechanically coupled to an internal combustion engine that mechanically couples to a transmission, e.g., the powertrain system 20 described with reference to FIG. 1. The control scheme 200 is described with reference to an upshift event, but the concepts described herein are applicable to downshift events in a similar manner.

The control scheme 200 operates upon commanding a shift in transmission operating range. In response to the shift command, an immediate response mode is activated and an immediate crankshaft torque for shift is commanded to effect the upshift. Operations of the slow actuators are controlled to achieve a predicted engine torque responsive to the operator torque request. Operation of the torque machine 35 is controlled to achieve a motor torque in response to a difference between the immediate crankshaft torque for shift command and actual engine torque, referred to as torque fill. An arbitrated predicted motor torque is determined during the upshift. Upon completing the upshift in the transmission operating range, a predicted response mode is activated, which includes determining a predicted crankshaft torque request and operation of the engine 40 is controlled to achieve the predicted engine torque. Operation of the torque machine 35 is controlled to achieve a motor torque in response to the predicted crankshaft torque request through an optimization routine that determines a torque split between the engine 40 and the torque machine 35.

An exemplary fill equation is shown as EQ. 1, below, and is employed to calculate a motor torque command (Tm) that needs to be produced in order to achieve a crankshaft torque (Tcs) that is responsive to the operator torque request for an engine-without-motor torque (Te), calculated for a known pulley ratio (PR) for the belt-alternator-starter mechanism 38, and expressed as follows.

$$Tm=(Tcs-Te)/PR \qquad [1]$$

The fill equation (EQ. 1) is used to determine a motor torque command (Tm) in response to the crankshaft torque (Tcs) and the engine-without-motor torque (Te). The crankshaft torque and the engine-without-motor torque may be determined at different stages in execution of the control scheme 200 and depending upon the operating mode, as described herein.

Figure 3:
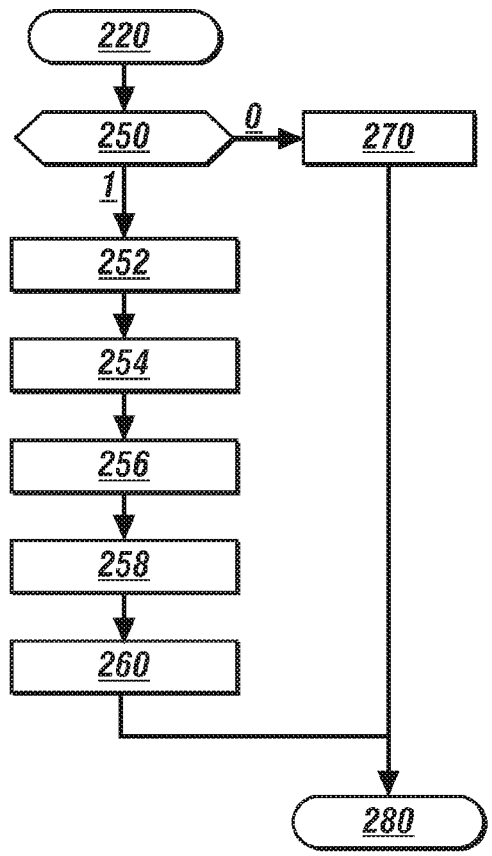
Figure 4:
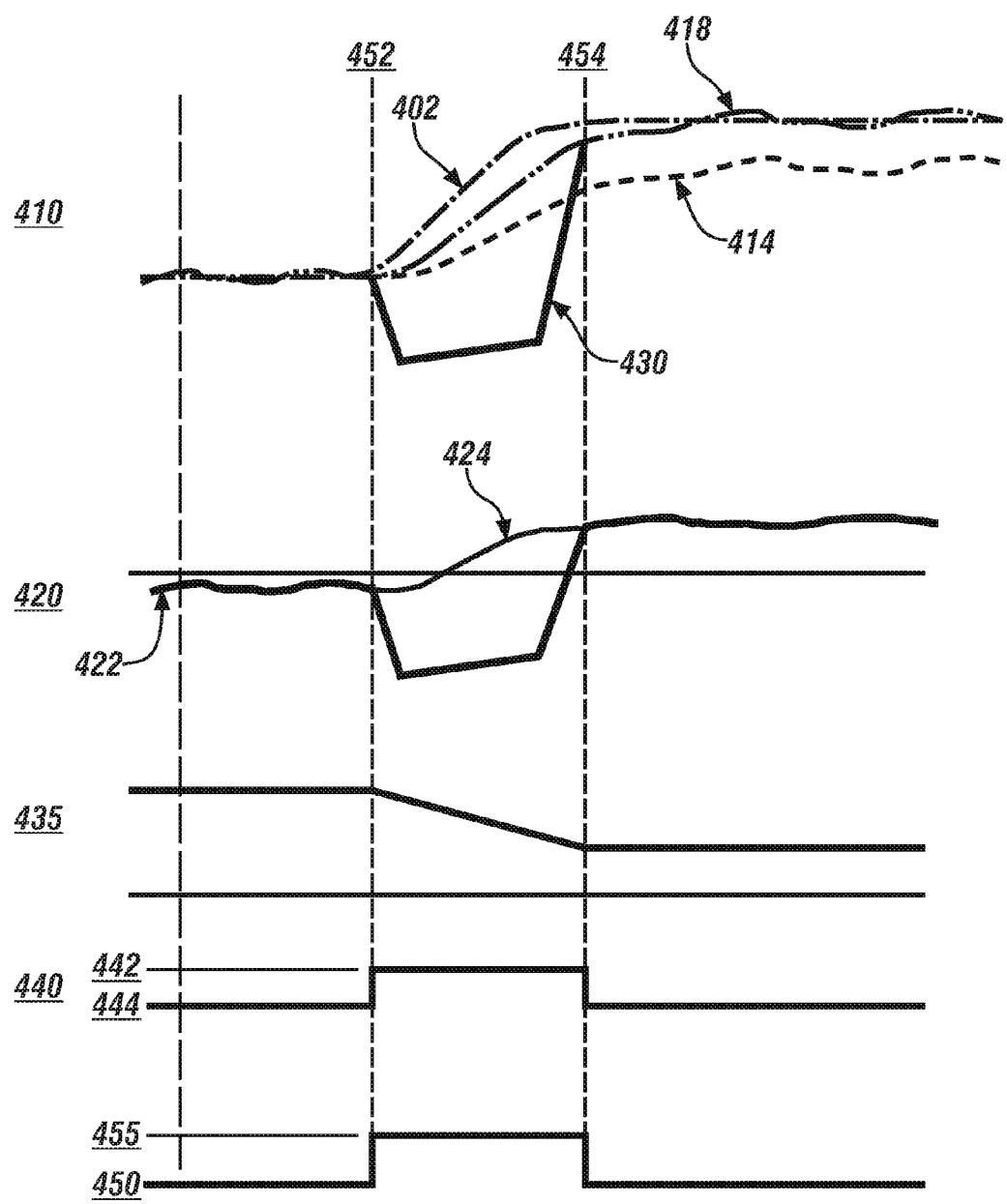
FIG. 4 illustrates operation of various elements of an embodiment of the powertrain system shown with reference to FIG. 1 associated with execution of the control scheme shown with reference to FIGS. 2 and 3 in accordance with the disclosure.

FIG. 4 graphically shows coincident torque and speed elements associated with an embodiment of the powertrain system 20 shown with reference to FIG. 1 associated with execution of the control scheme 200 shown with reference to FIGS. 2 and 3. FIG. 4 shows time-coincident torque and speed elements relative to elapsed time on the x-axis, and include the following:
- an operator torque request line (402);
- engine torque commands 410 including a predicted engine-without-motor torque (line 414);
- motor torque commands 420 including an immediate motor torque (line 422) and a predicted motor torque (line 424);
- engine speed 435;
- system response modes 440 including an immediate response mode (442) and a predicted response mode (444);
- a transmission command 450 including an immediate crankshaft torque for shift command (455); and
- a possible crankshaft torque (line 418).

Table 1 is provided as a key wherein the numerically labeled blocks and the corresponding functions are set forth as follows, corresponding to the flowchart 200 of FIG. 2.

TABLE 1

| BLOCK | BLOCK CONTENTS |
|---|---|
| 202 | Monitor Treq; Determine Tcs-prd responsive to Treq |
| 204 | Determine Tm-prd Determine Te-prd in response to Tcs-prd Determine Tm-Opt in response to Tcs-prd, SOC, engine efficiency |
| 206 | Command shift in response to Treq |
| 208 | Begin executing shift event |
| 210 | Activate immediate response mode command Tcs__us__immed |
| 212 | Determine Te-imm = Tcs__us__immed + Tm-regen |
| 214 | Control engine operation during shift event Control engine airflow actuators in response to Te-prd Control spark actuator in response to Te-imm |
| 216 | Determine Te-act |
| 218 | Control motor torque Tm-imm = Tcs__us__immed − Te-act |
| 220 | Determine Tm-prd-arb |
| 222 | Determine Tcs-poss = Tm-prd-arb + Te-prd Communicate Tcs-poss to transmission |
| 224 | Complete execution of the upshift event |
| 226 | Activate predicted response mode to control motor torque, engine torque |
| 228 | Command engine torque = Te-prd |
| 230 | Command motor torque using fill equation Tm = (Tcs-prd − Te-act)/PR |

During ongoing operation, an operator torque request (Treq) (shown as line 402 in FIG. 4) is monitored and the powertrain system 20 commands the engine 40 and the torque machine 35 to deliver a combined predicted crankshaft torque (Tcs-prd) that is responsive to the operator torque request (202). The crankshaft torque is the magnitude of torque delivered across the output member 33 to the transmission 50.

A predicted response mode (shown as line 444 in FIG. 4) is initially selected as preferred response mode, which leads to using a predicted engine-without-motor torque command (Te-prd) (shown as line 414 in FIG. 4) and a predicted motor torque command (Tm-prd) (shown as line 424 in FIG. 4) to control operation of the engine 40 and the torque machine 35, respectively. The predicted engine-without-motor torque command and the predicted motor torque command are combined to achieve the crankshaft predicted torque request. A preferred steady-state motor torque operating point is determined in response to the crankshaft predicted torque request, taking into account a battery state of charge, a map of the engine efficiency at different speed and load points, and other factors. The crankshaft predicted torque request is monitored to determine a preferred split between torque machine torque output and engine torque output. The crankshaft predicted torque request is used to determine the desired engine predicted torque command (Te-prd) in both predicted and immediate response modes (204). As indicated in FIG. 4, the operator torque request (shown as line 402 in FIG. 4) is primarily achieved using the engine 40 commanded to operate at the predicted engine-without-motor torque command, with the predicted motor torque command slightly negative, reflecting drag associated with the torque machine operating to generate electric power to supply electrical loads. The system response modes (shown as line 440 in FIG. 4) include the predicted response mode (shown as line 444 in FIG. 4) and the immediate response mode (shown as line 442 in FIG. 4). The system response modes refer to torque requests or commands for controlling operation of the torque actuators, i.e., the torque machine 35 and the internal combustion engine 40. A predicted torque request or command is used as a torque control setpoint that is preferably delivered in a reasonable amount of time in a smooth filtered-like fashion while using the torque actuators to deliver torque with due consideration to factors related to fuel economy, responsiveness, exhaust heating and others. This includes consideration of intake manifold fill times, signal latencies, and others. Response to the predicted torque request is preferably performed using engine airflow actuators including throttle, boost, EGR and cam phasers on the engine. The torque machine 35 is controlled in response to the predicted torque request such that the sum of the motor torque and the engine torque is responsive to the predicted torque request. An immediate torque request or command is used as a torque control setpoint when there is a requirement for a relatively fast and accurate torque control and less short-term concern for fuel economy. Response to an immediate torque request is achieved by controlling engine actuators including spark, fuel mass, and fuel injection timing, and by controlling the torque machine 35 including controlling current flow. The torque machine 35 is considered a fast actuator.

A transmission shift is commanded (shown at time point T1 452 in FIG. 4), and is an upshift as shown. The transmission shift is preferably commanded in response to the operator torque request, and is executed to achieve a balance between an engine operating point and a transmission output speed that is responsive to an operator request for acceleration while minimizing fuel consumption (206).

Execution of the upshift event begins (208), and includes activating the immediate response mode (shown with line 442 in FIG. 4) and commanding an immediate crankshaft torque for shift command, which is associated with execution of the upshift in this embodiment (shown at line 430 in FIG. 4) (210).

Activating the immediate response mode in response to the commanded transmission shift leads to operating the powertrain system 20 using the immediate engine torque and an immediate motor torque (shown as line 422 in FIG. 4) to control operation of the engine 40 and the torque machine 35, respectively. The immediate response mode 442 remains active for the duration of the upshift (shown ending at time point T2 454 in FIG. 4). When the immediate response mode (shown as line 442 in FIG. 4) is activated as the preferred response mode, the powertrain system 20 is operated using the crankshaft predicted torque request and the immediate crankshaft torque for shift command. The immediate crankshaft torque for shift command originates as a shift torque management command (e.g., from a transmission controller) that dictates a magnitude of torque output from the crankshaft 36 to the output member 33 that mechanically couples to the transmission 50. As shown, the immediate crankshaft torque for shift command decreases for a period of time to allow the transmission 50 to execute the shift by offloading torque of an off-going clutch associated with an off-going gear ratio and activating an oncoming clutch associated with an oncoming gear ratio. The immediate crankshaft torque for shift command increases to a preferred torque corresponding to operating in the oncoming gear, which includes operating at an increased engine torque that is determined by the operator torque command through the crankshaft predicted torque request.

When the immediate response mode is active, the immediate engine torque command (Te-imm) is determined as an additive sum of immediate crankshaft torque for shift command plus the motor torque (Tm-regen) at its regenerative capacity, preferably using the fill equation (EQ. 1) (212).

Engine operation during the shift event is controlled. The immediate engine torque is commanded to reduce torque to achieve the immediate torque for shift command when the motor torque is saturated. This is because it is more efficient to use the torque machine to reduce crankshaft torque than it is to use the engine with retarded engine spark. Therefore, the immediate engine torque command is equal to the immediate crankshaft torque for shift command plus the motor torque at its regenerative capacity (214). During the shift when the immediate response mode is active, the engine is controlled in response to both the predicted engine torque command and the immediate engine torque command. The predicted engine torque command is determined in response to the predicted crankshaft torque request. The engine airflow actuators are controlled in response to the predicted engine-without-motor torque command, and the spark actuator is controlled in response to the immediate engine torque command.

Actual engine-without-motor torque (Te-act) is determined using known methods and follows the immediate engine torque command (216). The engine air torque (Te-air) may be determined, and is an unmanaged engine torque capability at the present engine operating point when operating without constraints. The engine air torque (Te-air) follows the predicted engine-without-motor command.

Motor torque is controlled using an immediate motor torque command (Tm-imm) which is determined as a difference between the immediate crankshaft torque for shift and the actual engine torque, preferably using the fill equation (EQ. 1) (218). The immediate motor torque is negative during most of the upshift event, which means that the torque machine 35 operates in an electric regeneration mode to absorb the engine torque to achieve a crankshaft torque at the output member 33 that is input to the transmission 50 which is responsive to the immediate crankshaft torque for shift command.

A possible crankshaft torque (Tcs-poss) (shown at line 418 in FIG. 4) is determined as described herein, and is a combination of the predicted engine-without-motor torque command and an arbitrated predicted motor torque.

During the execution of the upshift event when the immediate response mode remains active, a calculated motor torque is determined and used in place of the actual motor torque in determining an arbitrated predicted motor torque (shown at line 424 in FIG. 4) (220). Determining the arbitrated predicted motor torque is described with reference to a flowchart depicted in FIG. 3. Table 2 is provided as a key wherein the numerically labeled blocks and the corresponding functions are set forth as follows, corresponding to the flowchart of FIG. 3.

TABLE 2

| BLOCK | BLOCK CONTENTS |
|---|---|
| 220 | Determine Tm-prd-arb |
| 250 | Is system response mode an immediate response mode? |
| 252 | In immediate response mode: Calculate Te-imm |
| 254 | Calculate Tcs-prd-target |
| 256 | Determine Tm-prd-des |
| 258 | Determine Tm-max |
| 260 | Determine Tm-prd-arb as minimum of Tm-max and (Tcs-prd − Te-prd) |

TABLE 2-continued

| BLOCK | BLOCK CONTENTS |
|---|---|
| 270 | Not in immediate response mode: Tm-prd-arb = Tm-act |
| 280 | Return |

The arbitrated predicted motor torque (Tm-prd-arb) is determined using a calculated motor torque in place of the actual motor torque (Tm-Act) when the response mode 440 indicates the system is operating with the immediate response mode activated or recently activated. The arbitrated predicted motor torque is calculated using the fill equation (EQ. 1), with torque inputs that preferably mimic a commanded motor torque equation used to control the engine 40 in combination with the torque machine 35 to achieve a predicted crankshaft torque request in response to the operator torque request. As such, the arbitrated predicted motor torque is calculated as the motor torque that would be produced if the system were responding to the predicted crankshaft torque request.

Determining the arbitrated predicted motor torque includes the following steps. It is initially determined whether the commanded system response mode is the immediate response mode, or alternatively, the predicted response mode (250). When the commanded system response mode is the predicted response mode, the arbitrated predicted motor torque (Tm-prd-arb) is set equal to the actual motor torque (Tm-act) when operating using the predicted response mode (270), and execution of the flowchart 220 terminates and returns to execution of flowchart 200 (280).

When the commanded system response mode is the immediate response mode, the arbitrated predicted motor torque is determined as follows. A magnitude of the engine-without-motor torque (Te-imm) is calculated using the fill equation (EQ. 1) when operating using the immediate response mode (252).

When not operating in the DFCO mode, the crankshaft torque (Tcs) is achieved with a combination of torque output from the engine 40 and torque output from the torque machine 35. The engine-without-motor torque for use in the fill equation (EQ. 1) is preferably equal to the response from the predicted engine-without-motor torque command, which is the unmanaged engine torque capability (Te-air) at the present engine operating point when operating without constraints, also referred to as an air torque output from the engine. A predicted engine-without-motor torque response (Te-prdresp) is equal to the unmanaged air torque of the engine for the operating point when DFCO is not active.

The predicted engine-without-motor torque response is equal to the actual engine-without-motor torque when DFCO is active. When operating in the DFCO mode, the crankshaft torque is achieved by controlling immediate engine actuators, e.g., controlling fuel injectors to discontinue fuel delivery. The engine-without-motor torque for use in the fill equation (EQ. 1) is preferably equal to the actual engine-without-motor torque under the present operating conditions.

A predicted crankshaft torque target (Tcs-prd-trgt) is calculated for use in the fill equation (EQ. 1) (254). The predicted crankshaft torque target is set equal to the predicted crankshaft torque request (Tcs-prd) that has been filtered using a low pass filter. The filtered predicted crankshaft torque request is equal to the target torque used by the motor torque control when operating with the immediate response mode deactivated, i.e., operating using the predicted response mode. The motor torque control uses a filtered crankshaft target when the predicted response mode is active to make a fast actuator, e.g., the torque motor 35 respond as a slow actuator.

A desired motor torque predicted is determined (256), and conveys a desired motor torque to achieve the predicted crankshaft torque request. The desired motor torque predicted is preferably calculated using the fill equation (EQ. 1) using the predicted engine-without-motor torque response (Te-prdresp) and the predicted crankshaft torque request.

The commanded motor torque may not be equal to the desired motor torque predicted (Tm-prd-des) because of limitations. The motor torque control system may have to limit the motor torque because the battery state of charge is low, because of physical battery or motor limits or because assisting with the torque machine would be an inefficient use of electrical energy.

A maximum motor torque limit (Tm-max) is determined to comprehend the limiting factors (258). The maximum motor torque represents a maximum magnitude of torque the torque machine 35 is capable of achieving while accounting for optimizing fuel economy and battery SOC. This is typically a positive value, indicating tractive torque for positive acceleration. The maximum motor torque may instead be negative reflecting the need of the system to provide regenerative charging even though the predicted crankshaft torque request cannot be achieved solely with engine torque.

The arbitrated predicted motor torque is selected as the minimum one of the maximum motor torque limit (Tm-max) and a difference between the predicted crankshaft torque target calculated for use in the fill equation (EQ. 1) and the calculated engine-without-motor torque (260). Execution of the flowchart 220 terminates and returns to execution of flowchart 200 (280).

Subsequent to determining the arbitrated predicted motor torque and the predicted engine engine-without-motor torque (shown as line 414 in FIG. 4), the possible crankshaft torque (shown at line 418 in FIG. 4) is calculated (222). The possible crankshaft torque is preferably an arithmetic sum of the predicted engine-without-motor torque and the arbitrated predicted motor torque.

Execution of the upshift event is controlled using the transmission command, including completing executing the shift event using the immediate crankshaft torque for shift command and the possible crankshaft torque, shown at time point T2 454. The possible crankshaft torque is communicated to transmission controller to schedule clutch pressures at the end of the shift event.

Execution of the upshift event is completed (224), and the predicted response mode (shown as line 444 in FIG. 4) is activated to control the motor torque and the engine torque (226) with the engine torque commanded using the predicted engine-without-motor torque (228). The motor torque command (Tm) for controlling the torque machine 35 is determined using the fill equation (EQ. 1) using the actual engine-without-motor torque (Te-act) and the predicted crankshaft torque request as the crankshaft torque term (230).

Figure 5:
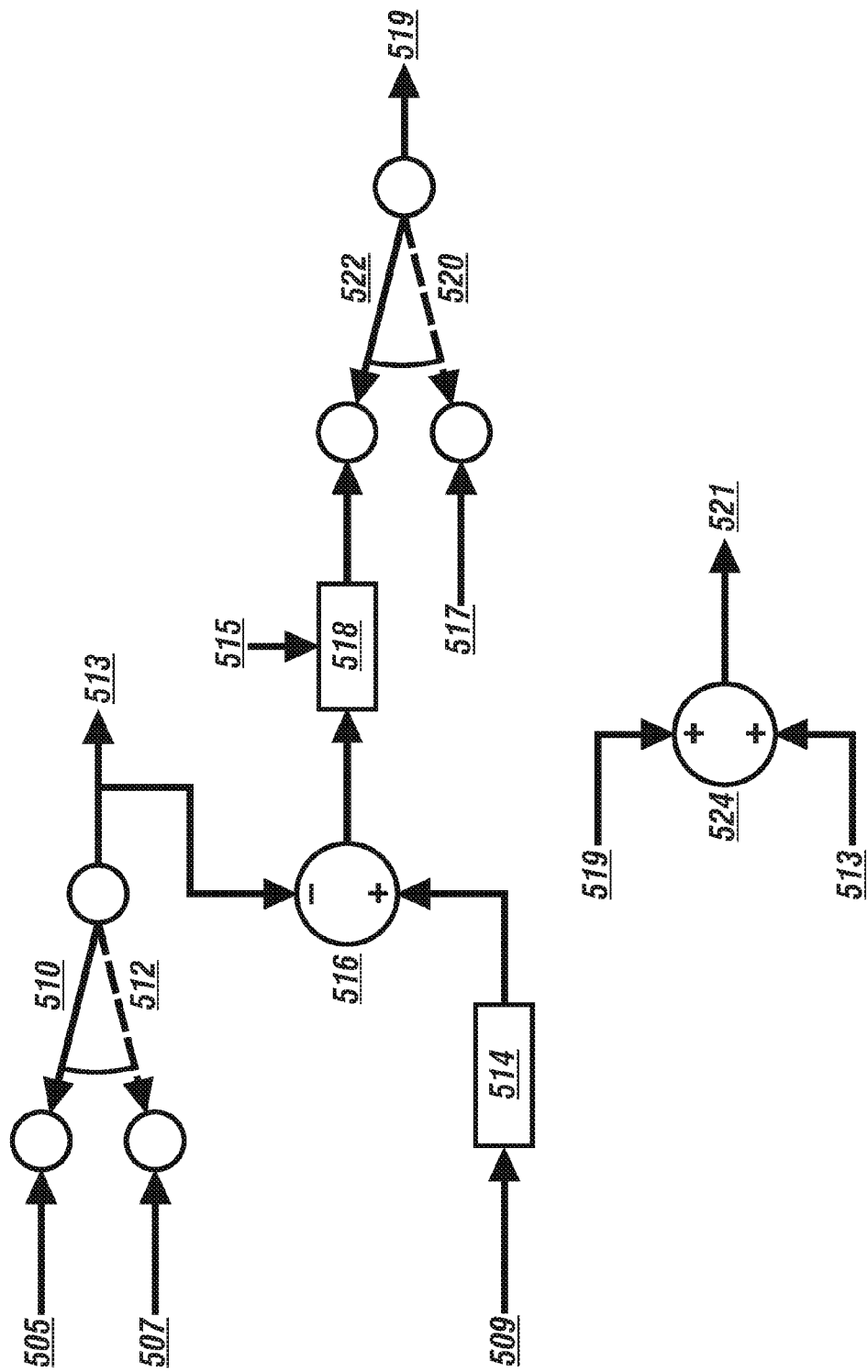
FIG. 5 illustrates an embodiment of a routine to determine magnitude of the possible crankshaft torque for an embodiment of the powertrain system shown with reference to FIG. 1 associated with execution of the control scheme shown with reference to FIGS. 2 and 3 in accordance with the disclosure.

FIG. 5 schematically shows an embodiment of a routine operation to determine magnitude of the possible crankshaft torque 521.

Inputs include the engine air torque 505 and the actual engine-without-motor torque 507. When the powertrain system 20 is operating in DFCO (510), the predicted response engine-without-motor torque 513 is set equal to the engine air torque 505.

When the powertrain system 20 is not operating in DFCO (512), the predicted response engine-without-motor torque 513 is set equal to the actual engine-without-motor torque 507.

The predicted response engine-without-motor torque 513 is subtracted from the predicted crankshaft torque request 509 that has been subjected to a lag filter 514 (516), and the difference is compared to the maximum motor torque limit 515 (518). The minimum of the maximum motor torque limit 515 and the difference between the predicted crankshaft torque request 509 and the predicted response engine-without-motor torque 513 is used as the arbitrated predicted motor torque 519 when the immediate crankshaft mode is active, i.e., when a transmission shift is being executed (522). When the immediate crankshaft mode is inactive, i.e., when a transmission shift is not being executed (520), the actual motor torque command 517 is used as the arbitrated predicted motor torque 519.

The arbitrated predicted motor torque 519 and the predicted engine-without-motor torque 513 are additively combined to determine the magnitude of the possible crankshaft torque 521.

The control scheme described herein provides a method to communicate the needed signal, i.e., the possible crankshaft torque to the transmission on systems that use both the engine and torque machine to respond to immediate torque requests, while comprehending airflow and other actuator actuation delays. The control scheme comprehends actuator limitations such as an unthrottled engine or motor torque limitations due to physical limits, SOC or FE degradation. The control scheme comprehends motor torque delays in achieving a commanded motor torque by using the actual motor torque when immediate requests are not active. The control scheme comprehends DFCO.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a powertrain system including a torque machine mechanically coupled to an internal combustion engine mechanically coupled to a transmission, comprising:
upon commanding a shift in a transmission operating range:
   a) activating an immediate response mode to effect the shift, including
      controlling the engine to achieve a predicted engine torque command responsive to an output torque request, and
      controlling motor torque of the torque machine in response to a difference between an actual engine torque and an immediate crankshaft torque for a shift command;
   b) determining an arbitrated predicted motor torque; and
   c) determining a possible crankshaft torque in response to the arbitrated predicted motor torque and the predicted engine torque command; and
commanding operation of the transmission at the end of the shift in response to the possible crankshaft torque and activating a predicted response mode to complete the shift in the transmission operating range.

2. The method of claim 1, wherein commanding operation of the transmission at the end of the shift in response to the possible crankshaft torque comprises scheduling clutch pressures in response to the possible crankshaft torque.

3. The method of claim 1, wherein the predicted engine torque command comprises a predicted engine-without-motor torque command; and wherein determining the arbitrated predicted motor torque comprises equating the arbitrated predicted motor torque with a difference between a predicted crankshaft torque responsive to an operator torque request and the predicted engine-without-motor torque command when the immediate response mode is activated.

4. The method of claim 3, wherein equating the arbitrated predicted motor torque with the difference between the predicted crankshaft torque responsive to the operator torque request and the predicted engine-without-motor torque command when the immediate response mode is activated comprises equating the arbitrated predicted motor torque with a maximum motor torque limit when the immediate response mode is activated when the difference between the predicted crankshaft torque responsive to the operator torque request and the predicted engine-without-motor torque command is greater than the maximum motor torque limit.

5. The method of claim 4, wherein the maximum motor torque limit corresponds to a maximum magnitude of torque that the torque machine is capable of achieving.

6. The method of claim 1, wherein determining the possible crankshaft torque in response to the arbitrated predicted motor torque and the predicted engine torque command comprises adding the arbitrated predicted motor torque and the predicted engine torque command.

7. The method of claim 1, wherein controlling the engine to achieve the predicted engine torque command comprises controlling the engine to achieve a predicted engine-without-motor torque command.

8. A method for operating a powertrain system including a torque machine mechanically coupled to an internal combustion engine mechanically coupled to a transmission, comprising:
   upon commanding a shift in a transmission operating range:
      a) activating an immediate response mode to effect the shift, including
         controlling the engine to achieve a predicted engine torque command responsive to an output torque request, and
         controlling motor torque of the torque machine in response to a difference between an actual engine torque and an immediate crankshaft torque for a shift command;
      b) determining an arbitrated predicted motor torque; and
      c) determining a possible crankshaft torque in response to the arbitrated predicted motor torque and the predicted engine torque command; and
   upon completing the shift in the transmission operating range:
      a) activating a predicted response mode to complete the shift, including:
         commanding operation of the engine in response to the predicted engine torque command, and
         commanding operation of the torque machine in response to the actual engine torque and a predicted crankshaft torque request responsive to an operator torque request.

9. The method of claim 8, wherein determining the arbitrated predicted motor torque comprises equating the arbitrated predicted motor torque with an actual motor torque when commanding operation in the predicted response mode.

10. The method of claim 8, wherein the predicted engine torque command comprises a predicted engine-without-motor torque command; and wherein determining the arbitrated predicted motor torque comprises equating the arbitrated predicted motor torque with a difference between the predicted crankshaft torque responsive to the operator torque request and the predicted engine-without-motor torque command when the immediate response mode is activated.

11. The method of claim 10, wherein equating the arbitrated predicted motor torque with the difference between the predicted crankshaft torque responsive to the operator torque request and the predicted engine-without-motor torque command when the immediate response mode is activated comprises equating the arbitrated predicted motor torque with a maximum motor torque limit when the immediate response mode is activated when the difference between the predicted crankshaft torque responsive to the operator torque request and the predicted engine-without-motor torque command is greater than the maximum motor torque limit.

12. The method of claim 11, wherein the maximum motor torque limit corresponds to a maximum magnitude of torque the torque machine is capable of achieving.

13. The method of claim 8, wherein determining the possible crankshaft torque in response to the arbitrated predicted motor torque and the predicted engine torque command comprises adding the arbitrated predicted motor torque and the predicted engine torque command.

14. The method of claim 8, further comprising communicating the possible crankshaft torque to a controller configured to control operation of the transmission.

15. The method of claim 14, further comprising scheduling clutch pressures in response to the possible crankshaft torque at the end of the shift.

16. The method of claim 8, wherein controlling the engine to achieve the predicted engine torque command comprises controlling the engine operation to achieve the predicted engine torque command determined in response to a predicted crankshaft torque request.

17. A method for operating a powertrain system including a torque machine, an internal combustion engine, and a transmission, comprising:
   upon commanding a shift in a transmission operating range:
      a) activating an immediate response mode to effect the shift, including
         controlling the engine to achieve a predicted engine-without-motor torque command responsive to an output torque request, and
         controlling motor torque of the torque machine in response to a difference between an actual engine-without-motor torque and an immediate crankshaft torque for a shift command;
      b) determining an arbitrated predicted motor torque; and
      c) determining a possible crankshaft torque in response to the arbitrated predicted motor torque and the predicted engine-without-motor torque command; and
   upon completing the shift in the transmission operating range,
      activating a predicted response mode to complete the shift, including
         commanding operation of the engine in response to the predicted engine-without-motor torque command, and
         commanding operation of the torque machine in response to the actual engine torque-without-motor and a predicted crankshaft torque request responsive to an operator torque request.

* * * * *